2,888,384
PROCESS FOR THE PRODUCTION OF 10-HYDROXY-19-NORTESTOSTERONE BY RHIZOPUS

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application November 21, 1955
Serial No. 548,254

1 Claim. (Cl. 195—51)

The present invention relates to steroid compounds and is more particularly concerned with 10-hydroxy-19-nortestosterone (10,17β-dihydroxy-4-estren-3-one), the 17β-esters thereof and the process of production therefore.

The new compounds of the present invention, the 10-hydroxy-19-nortestosterone and the 17β-esters thereof can be represented by the following structural formula:

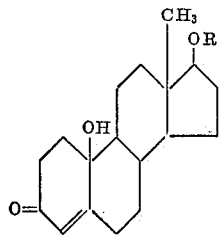

wherein R is selected from the group consisting of hydrogen and the acyl radical of a hydrocarbon carboxylic acid containing from one to eight carbon atoms, inclusive.

The 10-hydroxy-19-nortestosterone is prepared by exposing 19-nortestosterone or any of the 17β-esters of 19-nortestosterone to the oxygenating action of a fungus of the order Mucorales preferably of the family Mucoraceae and specifically of the genus Rhizopus as described in United States application Serial No. 180,496, filed August 19, 1950, or Patent No. 2,602,769, and separating the thus produced 10-hydroxy-19-nortestosterone by chromatography and recrystallization.

This application is a continuation-in-part of our prior-filed copending application Serial No. 297,242, filed July 5, 1952.

In the preparation of the esters of 10-hydroxy-19-nortestosterone, the 10-hydroxy-19-nortestosterone is admixed with an acylating agent such as, for example, ketene, a ketene of a selected organic carboxylic acid, acid containing preferably between one and eight carbon atoms, inclusive, an acid, acid chloride, or acid bromide, or an acid anhydride, or other known acylating agent, usually in a solvent such as, for example, pyridine or the like, or in an inert solvent, including solvents like benzene, toluene, ether, and the like, and heated at a temperature between about zero degrees centigrade and the boiling point of the reaction mixture, usually about room temperature, for a period between about one half hour and about 96 hours. The time of reaction is somewhat dependent upon the temperature at which the reaction is carried out, the acylating agent, and the ratio of reactants. The reaction mixture is quenched with ice or cold water and the product is collected in an organic solvent which is thereafter washed with a mildly basic solution and water to obtain a solution of the product which is essentially neutral. In some instances, the product may be crystallized from the reaction mixture, in which event it may be advantageous to separate the product by filtration or other means, such as, for example, by recrystallization from a suitable solvent or by chromatographic purification, as deemed necessary.

It is an object of the present invention to provide 10-hydroxy-19-nortestosterone and the 17β-organic carboxylic acids thereof. It is a particular object of the present invention to provide a process for the production of 10-hydroxy-19-nortestosterone and the 17β-organic carboxylic acid acylates, preferably hydrocarbon carboxylic acid acylates wherein the acyl radical contains from one to eight carbon atoms, inclusive, of 10-hydroxy-19-nortestosterone. Other objects will be apparent to those skilled in the art to which this invention pertains.

The compounds of the present invention 10-hydroxy-19-nortestosterone and the esters thereof are useful as oral or parenteral anabolic agents, having in addition estrogenic properties. The 10-hydroxy-19-nortestosterone and the esters thereof are also important intermediates for the production of estradiol; in the presence of a strong acid, such as mineral acid, a simultaneous dehydration and rearrangement produces estradiol (cf. Example 11).

In carrying out the process of the present invention 19-nortestosterone, suitably in a solvent is subjected to a growth of a species of the fungus of the genus Rhizopus. Though Rhizopus nigricans is the preferred species other species of the genus Rhizopus are useful in the instant process such as, for example, Rh. arrhizus, Rh. microsporus, Rh. speciosus, Rh. equinus, Rh. circinas, Rh. oligosporus, Rh. pusillus, Rh. bovinus, Rh. cambodja, Rh. chinensis, Rh. tritici, Rh. suinus, Rh. oryzae, and the like.

The following examples illustrate the process and products of this invention, but the invention is not to be construed as limited thereto.

*Example 1.—10-hydroxy-19-normethyltestosterone*

A medium was prepared of twenty grams of corn steep liquor and ten grams of Cerelose or glucose diluted to one liter with water and adjusted to a pH between 4.8 and 5. One hundred liters of the sterilized medium thus prepared were inoculated with *Rhizopus nigricans,* American Type Culture Collection No. 6227b, and incubated for 24 hours at a temperature of 28 degrees centigrade using a rate of aeration of two liters of air per minute at 200 r.p.m. agitation. After 24 hours of aeration and agitation a solution of 25 grams of nortestosterone, dissolved in 500 milliliters of acetone, was added. After an additional 24 hour period of incubation the beer and mycelium were extracted with acetone. The mycelium was filtered, washed twice each time with a volume of acetone approximately equal to the volume of the mycelium and extracted twice each time with a volume of methylene chloride approximately equal to the volume of the mycelium. The acetone and methylene chloride extract including solvent were added to the beer filtrate. The mixed extract and beer filtrate were extracted successively with two one-half by volume portions of methylene chloride and with two one-fourth portions of methylene chloride. The combined methylene chloride extracts were washed with two one-tenth by volume portions of a two percent aqueous solution of sodium bicarbonate and then with two one-tenth by volume portions of water. After drying the methylene chloride extract with about three to five grams of anhydrous sodium sulfate per liter of solution and filtering, the solvent was removed by distillation. The thus obtained residue, 62 grams, were treated as follows: Digestion of the extractives with 120 milliliters of petroleum ether in four portions removed 34 grams of oil, leaving 28 grams of insoluble residue containing practically all the steroid. Separation of the residue was accomplished by exhaustive chromatography over Florisil magnesium silicate as follows:

The 28 grams of petroleum ether-insoluble material was digested in 1.5 liters of warm benzene for one hour.

4.1 grams of crystals of 6β-hydroxy-19-nortestosterone was removed by filtration and the filtrate was thereupon adsorbed on 800 grams of Florisil. The column was eluted with petroleum ether containing progressively increasing amounts of acetone. 250 milliliter fractions were collected as follows:

| Fraction | Solvent |
| --- | --- |
| 1-25 | Petroleum ether-acetone 97:3. |
| 26-98 | Petroleum ether-acetone 96:4. |
| 99-130 | Petroleum ether-acetone 92:8. |
| 131-190 | Petroleum ether-acetone 90:10. |
| 191-204 | Petroleum ether-acetone 88:12. |
| 205-228 | Petroleum ether-acetone 87:13. |
| 229-256 | Petroleum ether-acetone 85:15. |
| 257-292 | Petroleum ether-acetone 80:20. |

Fractions 131 to 190 were combined and after evaporation of the solvent yielded 1.8 grams of crude 10,17β-dihydroxy-4-estren-3-one. This material was recrystallized twice from ethyl acetate and methanol to give pure 10,17β-dihydroxy-4-estren-3-one (10-hydroxy-19-nortestosterone) of a melting point 199 to 205; rotation $[\alpha]_D$ 76 degrees (C=0.594 percent, methanol)

$\lambda_{max.}^{alc.}$ 237 mμ (15,025); $\gamma_{max.}^{Nujol}$ 3305, 1656, 1622 Cm.$^{-1}$ (hydroxyl, carbonyl, and conjugated double bond).

*Analysis.*—Calcd. for $C_{18}H_{26}O_3$: C, 74.44; H, 9.03. Found: C, 74.45, 74.52; H, 9.21, 8.77.

*Example 2.—10-hydroxy-19-nortestosterone 17β-acetate (10,17β-dihydroxy-4-estren-3-one 17-acetate)*

A solution containing 40 milligrams of 10-hydroxy-19-nortestosterone in 0.8 milliliter of pyridine and 0.4 milliliter of acetic anhydride was allowed to stand for a period of 24 hours at room temperature (twenty to thirty degrees centigrade). The solution was thereafter poured into 35 milliliters of water and filtered to yield 36 milligrams of solids which was recrystallized from ethyl ether to give 19 milligrams of 10-hydroxy-19-nortestosterone 17-acetate of melting point 184 to 185 degrees.

*Analysis.*—Calcd. for $C_{20}H_{28}O_4$: C, 72.26; H, 8.49. Found: C, 72.81; H, 8.63.

*Example 3.—10-hydroxy-19-nortestosterone 17β-propionate*

In the same manner as given in Example 2, 10-hydroxy-19-nortestosterone, dissolved in pyridine, is treated with propionic anhydride, to give 10-hydroxy-19-nortestosterone 17β-propionate.

*Example 4.—10-hydroxy-19-nortestosterone 17β-butyrate*

In the same manner as given in Example 2, 10-hydroxy-19-nortestosterone, dissolved in pyridine, is treated with butyric anhydride, to give 10-hydroxy-19-nortestosterone 17β-butyrate.

*Example 5.—10-hydroxy-19-nortestosterone 17β-valerate*

In the same manner as given in Example 2, 10-hydroxy-19-nortestosterone, dissolved in pyridine, is treated with valeric anhydride, to give 10-hydroxy-19-nortestosterone 17β-valerate.

*Example 6.—10-hydroxy-19-nortestosterone 17β-benzoate*

In the same manner as given in Example 2, 10-hydroxy-19-nortestosterone, dissolved in pyridine, is treated with benzoyl chloride, to give 10-hydroxy-19-nortestosterone 17β-benzoate.

*Example 7.—10-hydroxy-19-nortestosterone 17β-(β-cyclopentylpropionate)*

In the same manner as given in Example 2, 10-hydroxy-19-nortestosterone, dissolved in pyridine, is treated with β-cyclopentylpropionyl bromide, to give 10-hydroxy-19-nortestosterone 17β-(β-cyclopentylpropionate).

*Example 8.—10-hydroxy-19-nortestosterone 17β-phenylacetate*

In the same manner as given in Example 2, 10-hydroxy-19-nortestosterone, dissolved in pyridine, is treated with phenylacetyl chloride, to give 10-hydroxy-19-nortestosterone 17β-phenylacetate.

*Example 9.—10-hydroxy-19-nortestosterone 17β-phenylpropionate*

In the same manner as given in Example 2, 10-hydroxy-19-nortestosterone, dissolved in pyridine, is treated with phenylacetyl bromide, to give 10-hydroxy-19-nortestosterone 17β-phenylpropionate.

*Example 10.—10-hydroxy-19-nortestosterone 17β-acylates*

In the same manner as given in Examples 2 through 9, treating 10-hydroxy-19-nortestosterone with an acylating agent, such as an organic acid halide, a hydrocarbon carboxylic acid anhydride, chloride or bromide, ketenes derived from hydrocarbon carboxylic acids, results in the production of other 10-hydroxy-19-nortestosterone 17β-acylates, illustratively 10-hydroxy-19-nortestosterone isobutyrate, isovalerate, hexanoate, heptanoate, octanoate, dimethylacetate, trimethylacetate, toluate, anisate, gallate, salicylate, cinnamate, acid maleate, acid fumarate, acid succinate, acid tartarate, dihydrogencitrate, acrylate, crotonate, β-methylcrotonate, cyclohexanecarboxylate, chloroacetate, dichloroacetate, trichloroacetate, bromoacetate, acid quinolate, nicotinate, piperonate, 2-furoate, thioglycollate, para-chlorobenzoate, para-bromobenzoate, ortho-, meta-, para-nitrobenzoate, 3,5-dinitrobenzoate, benzenesulfonate, toluenesulfonate, para-nitrobenzenesulfonate, 3,5-dinitrobenzenesulfonate, benzenephosphonate and the like.

*Example 11.—Estradiol from 10-hydroxy-19-nortestosterone*

A mixture of 100 milligrams of 10-hydroxy-19-nortestosterone, five milliliters of acetic acid and one drop of sulfuric acid was heated on a steam bath for a period of one-half hour. The mixture was thereupon poured into fifty milliliters of ice water and the precipitate collected on filter. Recrystallization of the precipitate from acetone and Skellysolve B hexanes produced pure estradiol.

We claim:

A process for the production of 10-hydroxy-19-nortestosterone which comprises: growing a fungus of the genus Rhizopus under aerobic conditions, in the presence of a nutrient medium containing assimilable nonsteroidal carbon and 19-nortestosterone, and recovering the resulting 10-hydroxy-19-nortestosterone.

References Cited in the file of this patent

UNITED STATES PATENTS

| | | |
| --- | --- | --- |
| 2,602,769 | Murray et al. | July 8, 1952 |
| 2,683,725 | Murray et al. | July 13, 1954 |
| 2,692,273 | Murray et al. | Oct. 19, 1954 |